United States Patent
Fowler et al.

[11] 4,092,852
[45] June 6, 1978

[54] MULTIPLEXED TRANSDUCER

[75] Inventors: Albert Lewis Fowler, Kirkcaldry; David Martin Walker, Freuchie; Alastair Kershaw Stevenson, Glenrothes; Alan Graham Henderson, Markinch, all of Scotland

[73] Assignee: Hughes Microelectronics Limited, Glenrothes, Scotland

[21] Appl. No.: 779,587

[22] Filed: Mar. 21, 1977

[30] Foreign Application Priority Data

Mar. 23, 1976 United Kingdom ............... 11725/76
Apr. 30, 1976 United Kingdom ............... 17857/76
Nov. 16, 1976 United Kingdom ............... 47754/76

[51] Int. Cl.$^2$ ......................................... G01M 15/00
[52] U.S. Cl. ................ 73/117.3; 340/207 P
[58] Field of Search ............... 73/116, 117.3; 340/170, 340/197, 207 P; 336/87

[56] References Cited

U.S. PATENT DOCUMENTS

| | | | |
|---|---|---|---|
| 2,493,508 | 1/1950 | Thynell | 340/207 P |
| 3,906,437 | 9/1975 | Brandwein et al. | 73/117.3 X |
| 3,979,579 | 9/1976 | Kleinpeter | 73/116 X |

Primary Examiner—Jerry W. Myracle
Attorney, Agent, or Firm—Lawrence V. Link, Jr.; W. H. MacAllister

[57] ABSTRACT

A transducer responsive to a plurality of different parameters includes a plurality of sensing devices responsive to the parameters and arranged to combine two signals in relative proportions dependent upon the value of the parameter concerned. The two signals have the same frequency characteristic and are switched cyclically between different relative phases; typically the signals are switched between an in phase condition and a quadra-phase condition. A processing circuit is provided which compares the output of the different parameter sensing devices when the signals are in phase and in phase quadrature so as to derive output signals indicative of the values of the different parameters which are free of phase errors that would otherwise impair the output signals.

29 Claims, 21 Drawing Figures

DUAL AMPLITUDE MODULATOR

VECTOR SIGNAL MULTIPLEXER  FIG. 3.

LINEAR DEMODULATOR

1ST CYCLE | 2ND CYCLE | 3RD CYCLE | 4TH CYCLE

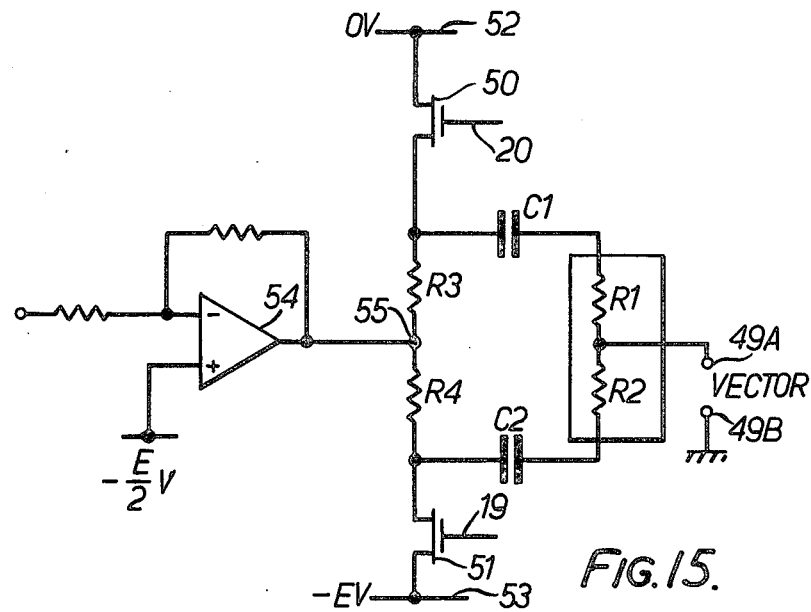

MULTIPLEXED TRANSDUCER

FIELD OF THE INVENTION

This invention relates to a transducer for producing electrical signals which are a function of a plurality of parameters such as for example displacement or temperature, the transducer of the invention having particular but not exclusive application to providing electrical signals indicative of a plurality of operating parameters of an internal combustion engine.

BACKGROUND OF THE INVENTION

A displacement transducer used, for example in measuring the level of vacuum in the inlet manifold of an internal combustion engine, is known and is described in the specification of U.S. Pat. No. 3,942,002 which is assigned to the Assignee of the present application. This known transducer has an opaque movable member which is arranged to be moved in accordance with a parameter to be monitored. The movable member is provided with a slit arranged to pass light from two sources in relative proportions depending upon the position of the slit and hence the movable member. The light sources are driven by pulse waveforms, the pulse widths of which are modulated sequentially in a sinusoidal and a cosinusoidal manner respectively, the sinusoidal and cosinusoidal modulation being at the same frequency. The light passed by the slit impinges upon a detector which provides an appropriate signal, the phase of which is indicative of the relative proportions of light from the two sources in the light impinging on the detector, and thus indicative of the position of the slit. This signal is amplified and shaped to provide a square waveform and is then passed through an harmonic filter to reduce contamination of the signal by harmonics of the frequency of the source drive signals. The filter however introduces an undesirable phase lag and degrades waveform squareness. The signal is again squared and passed through a threshold detector for noise reduction, and is then applied to a counter arranged to count clock pulses during the period of each pulse of the signal, the resultant count, neglecting the phase error, being indicative of the phase of the signal. To eliminate the phase errors introduced by the harmonic filtering etc., one of the sources is switched so that periodically the light supplied by the two sources is in phase. The counter output during such periods is indicative of the phase error. By switching the counter at the rate of switching of the phase of the switched phase light source so that the counter alternatively increments and decrements, the count at the end of one increment and decrement cycle indicates the connected phase required.

This prior transducer suffers from several disadvantages, one disadvantage being that the transducer can only be used to monitor one displacement parameter whereas in practice, it is often necessary to monitor more than one parameter concurrently, particularly when monitoring the operating condition of an internal combustion engine. Moreover, not all of the operating parameters of an internal combustion engine can be manifested conveniently as a displacement and hence the prior transducer has a limited application and is not entirely suited to a complex operating system such as an internal combustion engine. Also, the optical displacement sensing arrangement may not be suitable for measuring all types of displacement parameters.

SUMMARY OF THE PRESENT INVENTION

It is an object of the present invention to provide a transducer which can be rendered responsive to a plurality of parameters which are not necessarily displacement parameters.

More particularly, it is an object of the invention to provide a transducer responsive to parameters such as temperature, gas flow rate and the oxygen content of a gaseous stream.

Furthermore, it is an object of the invention to provide a transducer which is suited to provide an overall indication of the operating condition of an internal combustion engine.

These objects and others are accomplished by means of the present invention which provides a transducer that includes a signal generator that produces first and second signal trains having the same frequency characteristic. A control means is provided to change the relative phases of the signal trains during successive periods. Typically, these periods are of equal duration and during one period the signals are in phase, whilst during the next period, the signals are switched to a phase quadrature relationship. The two signals developed by the control means are applied to a plurality of sensing devices which are responsive to parameters such as displacement, temperature and gas flow rate. The parameter sensing devices are each arranged to combine selectively the first and second signal trains to provide a sum signal which, during the first period provides a reference phase but during the second period has a phase indicative of the parameter being sensed by the device. A selecting means is provided to select the sum signals from the various sensing devices one at a time and the selected sum signal is applied to a processing circuit which compares the phase of the selected sum signal during the first and second periods and derives therefrom a phase measurement signal indicative of the sensed parameter and substantially free of phase errors. Thus, in use of the transducer, the processing circuit will provide a sequence of output signals each indicative of one of the parameters sensed by the various sensing devices.

All of the transducer, apart from the sensing devices, can be manufactured as a large scale integrated circuit (LSI) chip and can be used with advantage to monitor the operating condition of an internal combustion engine to provide information for controlling spark ignition of the engine. The transducer is thus cheap to manufacture and is extremely reliable and accurate in use. Moreover, it can be used to monitor a wide variety of different parameters, thus making the transducer of the invention compatible with many different kinds of engines and suitable for measuring many different types of parameter.

The plurality of parameter sensing devices can conveniently include at least one device comprising first and second impedance elements connected to a sum signal output, said impedance elements being connected to receive respectively the first and second signal trains from the control means, and means for varying the impedance presented by the impedance elements in accordance with the value of one of the parameters so as to control the relative proportions of the first and second signals combined at the sum signal output, thereby to control the phase of the sum signal in accordance with the value of the parameter. Such a device can be adapted to sense displacement, temperature and gas flow rates.

Another form of sensing device for sensing a displacement parameter, comprises first and second coils to receive the first and second signals from said control means, third and fourth coils connected together to form said sum signal, a fixed screen having apertures therein to define a magnetic flux path between said first and third coils, and said second and fourth coils respectively, and a movable screen for being displaced in accordance with said parameter, the screen having apertures therein arranged such that the movable screen obturates said flux paths selectively in dependence upon the relative positions of the screens.

The transducer of the invention can also include a sensing device responsive to a voltage produced by, for example, a zirconium dioxide oxygen probe, to render the transducer responsive for example to the oxygen content of exhaust gases of an internal combustion engine.

Other objects, features and advantages of the invention will become apparent from the following description of a preferred embodiment of transducer of the invention, given by way of example with reference to the accompanying drawings.

BRIEF DESCRIPTION OF THE DRAWINGS

In the drawings:

FIGS. 12 to 14 are vector diagrams illustrative of the operation of the circuit arrangement of FIG. 11; and FIG. 15 is a schematic diagram of another circuit arrangement for producing an output signal having a phase indicative of the magnitude of an input voltage.

DESCRIPTION OF PREFERRED EMBODIMENT

Figure 1:
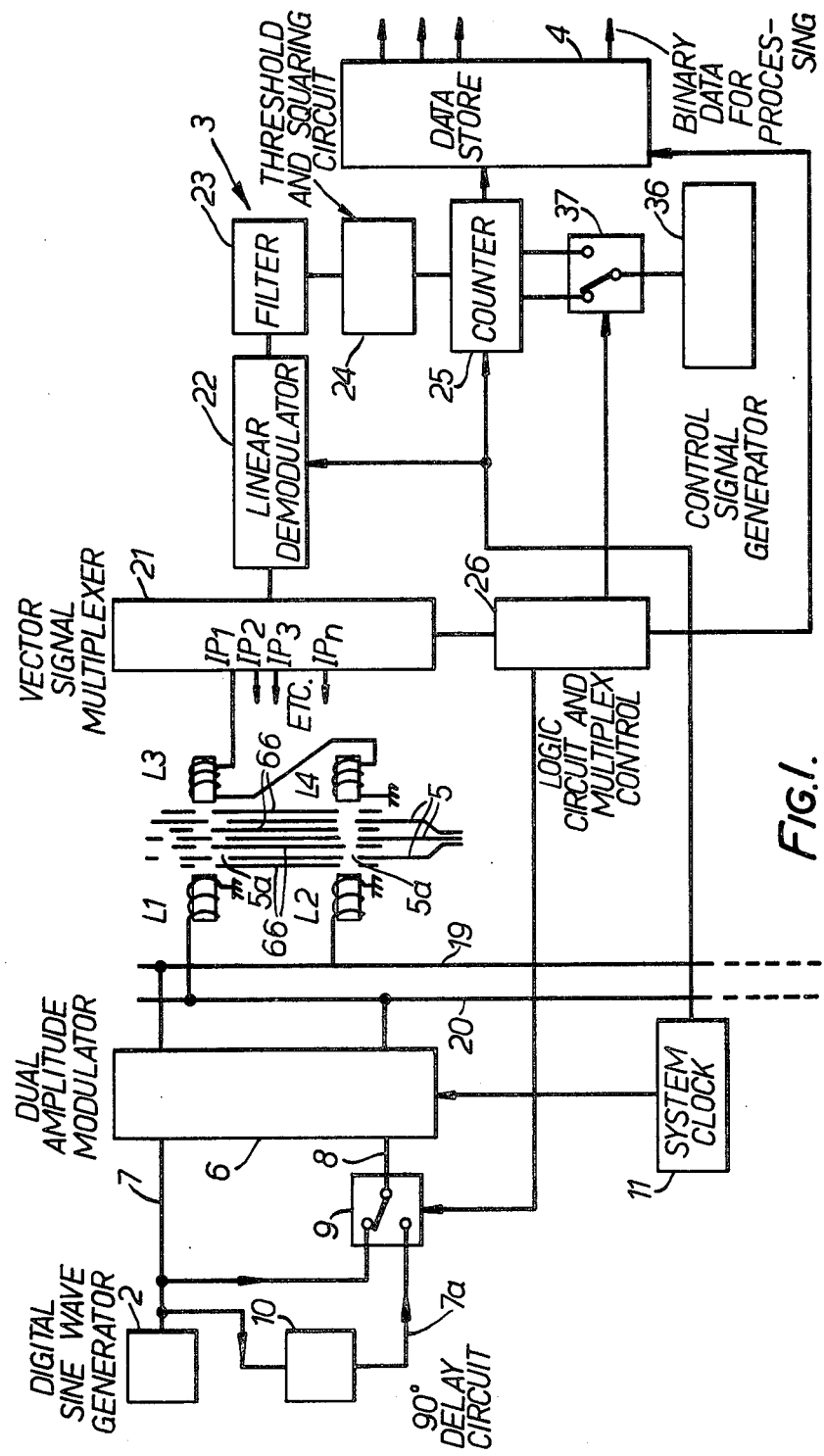
FIG. 1 is a schematic block diagram of a transducer in accordance with the invention.

Referring now to FIG. 1, the transducer includes a number of displacement sensing devices 1 only one of which is shown, which are fed with signals from a generator 2. Outputs from the sensing devices are fed one at a time into a processing circuit 3 which operates broadly in the manner described in the afore-mentioned U.S. Pat. No. 3,942,002. Displacement information derived by the processing circuit 3 is stored in a store 4 for further processing and display.

Each of the sensing devices 1 comprises four similar inductors L1 - L4 between which is arranged a movable shield 5. The inductors L1 and L2 receive signals from the generator 2 via a dual amplitude modulator 6, and induce signals in the inductors L3 and L4 respectively in dependence upon the position of the movable shield 5 which controls selectively the flux linkage between the inductors L1, L3 and L2, L4. The shield 5 includes holes 5A which in a datum position are aligned with holes in fixed shield 66 to provide passageways between the inductors, the flux in the passageways having a substantially uniform spatial density. Movement of the shields away from the datum position causes selective obturation of the passageways thereby changing the ratio of the flux linkage between the inductors L1, L3 and L2, L4.

Typically, three displacement sensing devices are provided and then the transducer can be used with advantage to provide electrical signals which are a function of operating parameters of, for example, an internal combustion engine.

For example, the movable shield 5 of the displacement sensors can be connected to a vacuum diaphragm to give say 60 thousandths of an inch travel for 0 to say 650 m.m. manifold depression, to a temperature bulb sensor coupled via a capillary to an actuating diaphragm against which a high pressure fluid expands under the influence of temperature at the sensing bulb, and the capillary gives say 60 thousandths of an inch diaphragm travel for the typical temperature range $-20°$ to $+120°$ C, and to throttle angle conversion mechanics connected to the engine accelerator pedal to give again the 60 thousandths of an inch displacement for full angular travel.

Figure 5A:
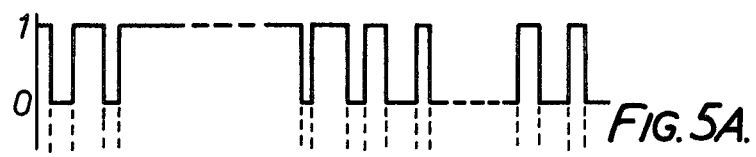
FIG. 5A-5G illustrate several waveforms developed in operation of the transducer.

The input coils L1 of the sensing devices 1 receive digital signals which comprise a regular train of pulse signals, the pulse width of which are modulated in a sinusoidal manner, the pulse width modulation sequence being arranged such that the signal includes a large sinusoidal component. The signals applied to the coils L2 have an identical waveform to those applied to L1 but are in phase quadrature and thus contain a substantial cosinusoidal component. The signal trains for the coils L1, L2 are derived by switching within the generator 2 and each have a waveform of the kind illustrated in FIG. 5A which is of the same form as that shown in FIG. 3A of U.S. Patent No. 3,942,002.

Two outputs are derived from the generator on lines 7 and 8 for application to the dual amplitude modulator 6. One of the outputs is derived directly from the generator on line 7 and has a pulse width modulated sequence containing a large sinusoidal component. The other output is provided on line 8 and can be derived directly from line 7 or from line 7a under the control of an electronic switch 9. Line 7a is derived from line 7 via a 90° delay circuit 10. Thus the signal for application to the coil L2 can be switched from a sinusoidal to a cosinusoidal pulse width modulated signal. However the signal fed to coil L1 is always modulated with the sinusoidal signal.

Before being fed to the coils L1, L2, the signals on lines 7 and 8 are used to amplitude modulate a carrier which is at a high frequency relative to that of the pulse width modulation so as to reduce the size of the coils L1 - L2 required to induce signals in the coils L3 - L4. The amplitude modulation is effected by means of the dual amplitude modulator 6 which is arranged to gate packets of high frequency clock pulses to the coils L1, L2 of the sensing devices, the duration of the packets being controlled in accordance with the width of the pulses of the pulse width modulated signals on lines 7 and 8. The dual amplitude modulator will now be described in more detail with reference to FIG. 2.

The pulse width modulated signals from the generator 2 are applied to the modulator on lines 7 and 8, and clock pulses from a clock pulse generator 11 are fed to the modulator as carrier. The modulator comprises two substantially identical circuit elements each associated with one of the lines 7, 8, and one embodiment thereof associated with line 7 will now be described in detail. The circuit element includes a two input AND gate 12 and a NAND gate 12a, each having an input connected to line 7. The other input of the NAND gate 12a is connected to receive clock pulses, at half the frequency of the clock pulse generator, from a frequency divider 13 fed by the system clock 11, while the other input of the AND gate 12 is arranged to receive an inverted clock pulse waveform from the divider 13 that is produced by means of an inverter 14. The output of NAND gate 12a is fed to a P-channel MOS transistor 15 whilst the output of gate 10 is fed to an N-channel MOS transistor 16. The sources and drains of the devices 15, 16 are connected mutually in series between positive and negative rails 17 and 18. An output from the circuit element is taken from the connection between the devices 15 and 16 and is applied to a rail 19 that is connected to the coils L1. An identical circuit element is provided which receives signals from the line 8 and provides an output signal to a line 20 that is connected to the coils L2.

Figure 5B:
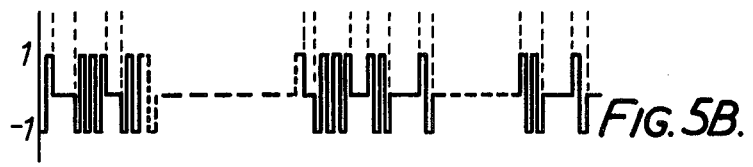

Considering now the operation of the circuit element connected to the line 7, when the input on line 7 has a logic zero (see FIG. 5A), then both devices 15 and 16 are non-conducting. However, when the input on line 7 has a logic "1", positive and negative going pulses are gated on to line 19. When the input on line 6 has a logic "1", and the clock output of divider 13 has a logic "0" then the output of inverter 14 has a logic "1", and hence the output AND gate 11 has a logic "1" and the N-channel device 16 is rendered conducting to hold the line 19 at the negative voltage; the gate 12a also being enabled to bias the P-channel device 15 to a non-conducting state. When the output of divider 13 moves to a logic "1", then similarly the P-channel device 15 is rendered conducting and the N-channel 16 is non-conducting, thereby to hold the line 19 at the positive voltage. In this way, packets of pulses having positive and negative voltage excursions are gated to the coils L1, the packets having a duration in dependence upon the width of the pulses of the waveform on line 7. An example of the waveform on line 19 which will occur with the waveform of FIG. 5A being applied to line 7, is shown in FIG. 5B.

The other circuit element operates in the same manner and gates positive and negative going pulses on to the line 20 in accordance with the width of the pulses on line 8.

In operation, the signals fed to the coils L1, L2 of each sensing device are arranged to cause signals to be induced in the coils L3 and L4 respectively. The coils L3 and L4 are connected in series to provide a sum signal S which is fed via a multiplexer 21 to a demodulator 22 that removes the modulation effect by the modulator 10.

Now, neglecting for the moment the dual amplitude modulation caused by the modulator 6, the signals developed on the lines 19 and 20, when in phase quadrature, can be considered to be of the form $\bar{\phi}_1$, $\bar{\phi}_2$ respectively, where $$\bar{\phi}_1 = \bar{A} \sin wt$$
$$\bar{\phi}_2 = \bar{A} \cos wt$$

where $w$ is the frequency of the pulse width modulation. Thus, the sum signal S induced in the coils L3, L4 will be of the form $$S = A/l \sin wt + A/m \cos wt$$

where $l$ and $m$ are factors determined by the flux linkage between the coils L1, L3 and L2, L4 respectively, $l$ and $m$ being determined by the displacement of the shield 5.

Figure 5C:
Figure 5D:
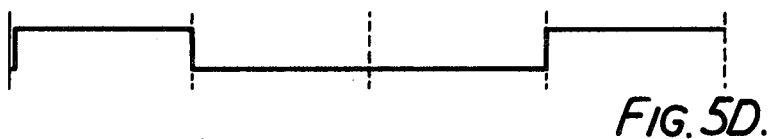
Figure 5E:
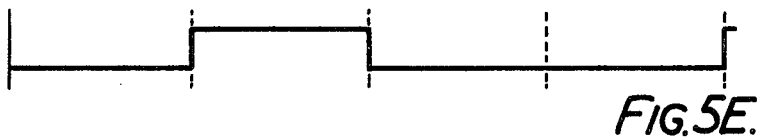
Figure 5F:
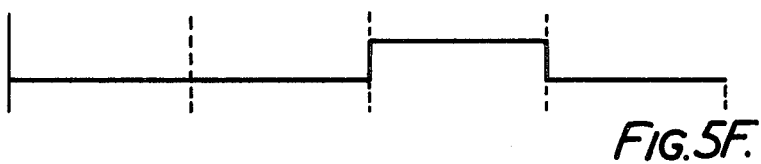
Figure 5G:
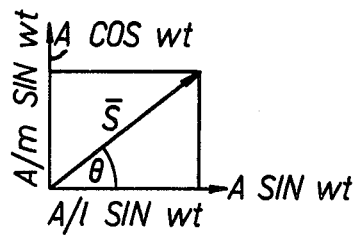

A vector diagram of $\bar{S}$ is shown in FIG. 5G from which it will be appreciated that S has a phase $\phi$ which is a function of $m$ and $l$, and thus the demodulated sum signal $\bar{S}$ produced by demodulator 22 has a phase $\phi$ which is a function of the position of the movable shield 5. However, from a reference to U.S. Pat. No. 3,942,002 aforementioned, it will be appreciated that when the signals applied to the coils L1 and L2 are in phase, the demodulated sum signal provides a reference phase which can be compared with the position indicative phase to derive a signal which is a function of the position of the shield 5 and which is substantially unaffected by phase lags and spurious phase errors which may occur in the circuits of the transducer.

A comparison between these two phases of the demodulated sum signal is effected by means of a filter 23, a threshold and squaring circuit 24, and a counter 25, in a similar manner to that described in the aforementioned U.S. Patent.

Samples of sum signals from each of the sensing devices are fed sequentially to the demodulator 22 by the multiplexer 21 so that the phase comparison can be carried out sequentially for the different sensing devices. The multiplexer will now be described in more detail with reference to FIG. 3, and comprises a number of gates, one for each sensing device 1, which are controlled by respective gate signals supplied by logic control circuits 26.

Figure 3:
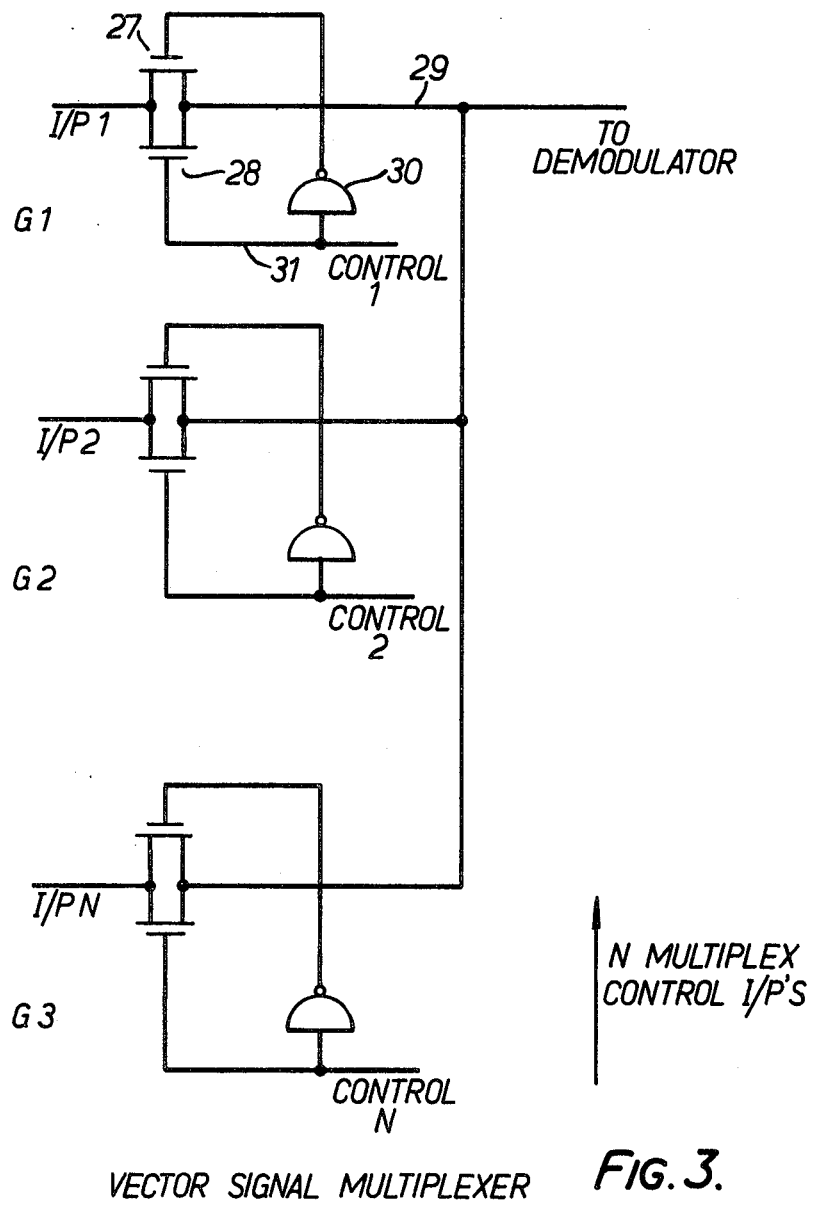
FIG. 3 is a more detailed schematic block diagram of a vector signal multiplexer shown in FIG. 1.

In FIG. 3, three such gates G1, G2 and GN are shown, one of which G1 will now be described in detail. The gate G1 comprises a P-channel and an N-channel MOS transistor 27 and 28 respectively, the sources of which are connected to receive the sum output of coils L3, L4 of one of the sensing devices 1. The drains of the transistors are connected to a line 29 which provides the input to the demodulator 22. The gate of the transistor 27 is connected through an inverter 30 to a line 31 connected to the gate of transistor 28, the line 31 receiving a gating signal from the logic circuits 26. Examples of the gating signals for the gates G1 – GN are shown in FIGS. 5D to 5F respectively.

Thus upon application of a positive going gating signal to line 31, the transistors 27, 28 are rendered conductive so as to pass the sum signal from the coils L3 and L4 to the demodulator 22. It will be appreciated that the positive and negative going signals fed to the coils L1, L2 induce in the coils L3, L4 a positive and negative going sum signal and that the transistors 27 and 28 pass respective positive and negative going portions of the sum signal.

Figure 4:
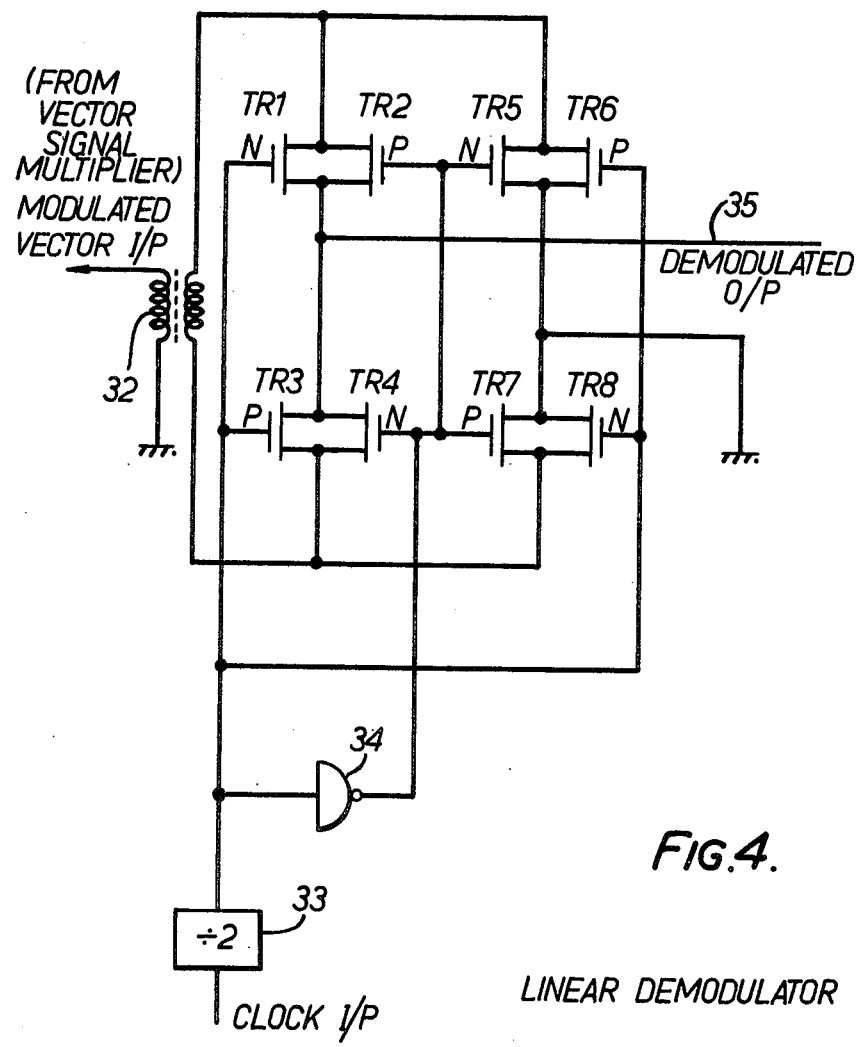
FIG. 4 is a more detailed schematic block diagram of a linear demodulator shown in FIG. 1.

The demodulator 22 is shown in more detail in FIG. 4. An input from the multiplexer is applied through a transformer 32 and across one diagonal of a bridge of four pairs of switching transistors TR1 to TR8. An output from the demodulator is taken relative to earth across the other diagonal of the bridge on line 35. Each pair of transistors comprises a P-channel and an N-channel transistor such as TR1 and TR2, and the gates of transistors TR1, TR3, TR6 and TR7 are connected to receive clock pulses from a divider 33 which produces an identical output from the system clock 11 as the divider 13 of the modulator 10 (see FIG. 2). The gates of the other transistors are connected to an inverter 34 that is connected to the output of the divider 33. When the output of divider 33 has a logic "1", transistors TR1, TR2, TR7 and TR8 are rendered conductive, so that a positive going pulse which is induced in the secondary coil of transformer 32 passes to the output line 35 through the conducting transistor pairs as a positive going signal. When the output of the divider 33 has a logic "0", the other transistors, namely TR3, TR4, TR5 and TR6 are rendered conductive so that a negative going pulse which is simultaneously induced in the secondary coil of transformer 33, is fed in the opposite sense to line 35 to provide a positive signal at the output and thereby to demodulate the positive and negative excursions that were introduced into the signals applied to the coils L1, L2.

Referring again to FIG. 1, the output of the demodulator is passed through the filter 23 to reduce the contamination thereof by harmonics that remain on the demodulator output signal, and the output of the filter is passed to the threshold detector and squaring circuit 24 which serves to normalise the maximum amplitude of the signal. The output of the threshold and squaring circuit is arranged to gate pulses from the system clock into the counter 25 which is arranged to count up and down under the control of a signal from a control signal generator 36, the counter being arranged to either increment or decrement under the control of an electronic switch 37 which controls application of the control signal to the counter. The switch is operated by a cyclic control signal from the logic circuits 26, to cause the counter to increment and decrement for equal periods, the control signal also controlling the electronic switch 37.

The output of the counter is fed to the binary store 4, information in the store being read out for further processing or display under the control of the logic circuits 26.

In operation of the transducer, the control signal, which is shown in FIG. 5C, operates the switch 9 cyclically so as to apply in phase and quadrature signals to the coils L1 and L2 sequentially and for equal durations. A gate signal shown in FIG. 5D is applied to the gate G1 so that during the first cycle of the control signal, the signals induced in the coils L3 and L4 of the sensing device 1 shown in FIG. 1 are fed to the demodulator 22 and thereafter to the counter 25 after being processed in the circuits 23 and 24. The counter 25 is arranged to increment during the first half of the cycle of the control signal so as to accumulate a count indicative of the phase of the sum signal whilst the input signals to coils L1 and L2 are in phase quadrature. As will be apparent from U.S. Pat. No. 3,942,002, the count will probably include errors due to spurious phase errors and phase lags developed in the circuits, and to remove such undesired errors, the counter 25 is arranged to decrement during the next half cycle of the control signal to subtract from the accumulated count a number indicative of the undesired errors, the number itself being indicative of the phase of the sum signal when the inputs to coils L1 and L2 are in phase. Thus, at the end of the first cycle of the control signal, the remaining count is indicative of the position of the movable shield 5. The control circuits 26 then cause the remaining count to be transferred to the data store 4.

Whilst the counter has been described as being switched to increment and decrement under the control of the signal shown in FIG. 5C, the control signal for the counter may have shorter duration pulses to allow for phase lags in the circuitry of the transducer, and such an arrangement is explained more fully in the aforementioned U.S. Patent.

During the second cycle of the control signal, the gate G1 is closed and the gate G2 is opened by a gate signal shown in FIG. 5E; and in a similar manner to that previously described, a count indicative of the position of the shield 5 of a second sensing device 1 (not shown) is accumulated in the counter 25 and transferred to the store.

Similarly during the third cycle of the control signal, a signal indicative of the position of the shield of a third sensing device is provided in the store, and then during the fourth and subsequent cycles of the control signal, the information in the store is updated so that changes in the positions of the shield 5 can be monitored.

As previously mentioned, the above described transducer has particular application to use in monitoring operating parameters of an internal combustion engine. The coils of the sensing devices can be of a compact nature and can be made cheaply in view of the fact that the modulator feeds high frequency signals (typically 1MHz), thereby reducing the size of the coils required. Also, a displacement sensing device of the above described kind can be designed to operate satisfactorily over a displacement range which is compatible with the range of conventional vacuum and temperature sensors for an internal combustion engine. Moreover, by multiplexing signals from several such transducers, a single counter can be used to provide displacement signals for each of the sensing devices, with an attendant reduction in cost of the system per sensing device. In a practical form of the transducer described above, a displacement signal can be processed in one millisecond so that each sensing device can be monitored once every three milliseconds.

The circuitry of the transducer conveniently can be manufactured by integrated circuit techniques.

The transducer described hereinbefore with reference to FIGS. 1 to 5 includes a plurality of similar sensing devices for determining the displacement of different members such that the transducer accumulates in its store 4, numbers indicative of the displacement of the different members, so as to provide an indication of the operating condition of the internal combustion engine.

However, to provide a fuller indication of the operating condition of a system such as an internal combustion engine, it may be desired to accumulate in the store 4 information regarding parameters other than displacement parameters. To this end, sensing devices other than the coil displacement devices of FIG. 1, can be incorporated into the transducer, the devices being driven by signals from the lines 19, 20 of FIG. 1 and providing output signals which are fed to the multiplexer 21 for processing into the store 4.

Several other forms of sensing device for the transducer will now be described.

Figure 6:
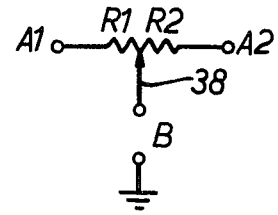
FIG. 6 is a schematic circuit diagram of another displacement sensing device for use in the transducer of FIG. 1.

Referring now to FIG. 6, there is shown another form of displacement sensing device that comprises a potentiometer having a slider 38 arranged to be moved along the resistive track of the potentiometer in accordance with a displacement to be sensed, and for example, the slider 38 could be connected to the throttle linkage of an internal combustion engine.

Figure 10:
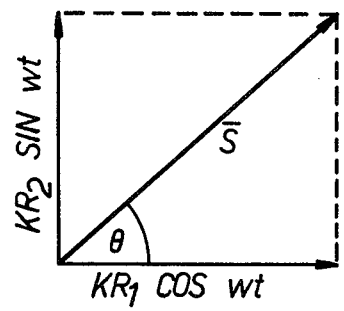
FIG. 10 is a vector diagram illustrating the output waveform developed by the displacement sensing device of FIG. 6.

The slider 38 divides the resistive track of the potentiometer into two variable resistance elements $R_1$ and $R_2$. The pulse width modulated signals $\bar{\phi}_1$, $\bar{\phi}_2$ developed on the lines 19 and 20 of FIG. 1 are applied to respective inputs A1 and A2 of FIG. 6, and an output signal $\bar{S}$ is taken at B between the slider 38 and earth potential. The output signal $\bar{S}$ is applied as an input to the multiplexer 21 of FIG. 1. Now when the signals on lines 19 and 20 are in phase quadrature, it can be seen that the output $\bar{S}$ is given by $$\bar{S} = \bar{\phi}_1/R_1 + \bar{\phi}_2/R_2$$

or
$$\bar{S} = K (R_2 \sin wt + R_1 \cos wt) - (i)$$
where $K = A (R_1 R_2)^{-1}$ A vector diagram of $\bar{S}$ is shown in FIG. 10 from which it will be appreciated that $\bar{S}$ has a phase $\phi$ given by $$\phi = \tan^{-1} R_1/R_2$$

and thus the output signal $\bar{S}$ has a phase indicative of the relative values of $R_1$ and $R_2$, the phase thus being indicative of the displacement of the slider 38 along the resistive track of the potentiometer.

Thus the output $\bar{S}$, after processing by the multiplexer 21, the demodulator 22, circuits 23, 24 and 25, will provide in the store 4 a number indicative of the position of the slider 38.

Figure 7:
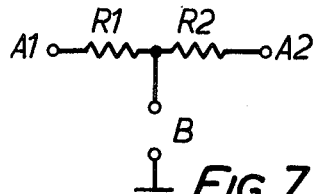
FIG. 7 is a schematic circuit diagram of a temperature sensing device for use with the transducer of FIG. 1.

Referring now to FIG. 7, a temperature sensor is shown which is similar in its operation to the arrangement of FIG. 6. The temperature sensor comprises a fixed value resistor $R_1$, and a temperature variable resistance element comprising a thermistor $R_2$ connected in series with resistor $R_1$. Input signals from lines 19 and 20 are applied to inputs $A_1$ and $A_2$ exactly the same manner as described with reference to FIG. 6, and it will be appreciated that the phase $\phi$ of an output signal $\bar{S}$ developed at B in FIG. 7 is a function of the ambient temperature of the environment in which the thermistor $R_2$ is situated. Thus, when the afore-mentioned pulse width modulated signals are applied to the inputs $A_1$ and $A_2$ from lines 19 and 20 respectively, and the phase $\phi$ of the output signal is detected by the aforementioned processing circuit 3, the processing circuit provides in the store 4 an output signal indicative of the temperature of the environment in which the thermistor $R_2$ is situated; the arrangement has particular application to monitoring the temperature of input air to an internal combustion engine.

Various modifications to the arrangement shown in FIG. 7 can be made and the arrangement can be modified to sense parameters other than temperature by replacing the temperature variable resistance element $R_2$ by an element which has an impedance which varies in accordance with a parameter other than temperature. For example magnetic field, strain and position sensitive resistor elements could be used instead of the thermistor $R_2$.

Figure 8:
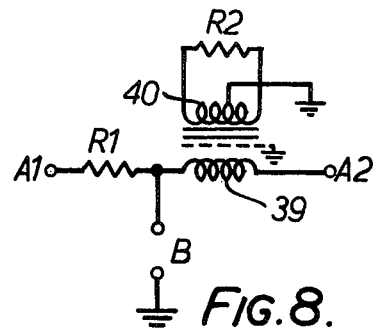
FIG. 8 is a schematic circuit diagram of another form of temperature sensing device.

Another modification of the sensor of FIG. 7 is shown in FIG. 8, and is particularly suited for measuring temperature in electronically noisy environments such as that obtaining in a vehicle powered by an internal combustion engine. In the device of FIG. 8, the variable resistor $R_2$, typically a thermistor, is situated remotely of the resistor $R_1$, and is connected to the resistor $R_1$ by means of a transformer $T_1$. The transformer has a primary coil 39 connected in series with the resistor $R_1$, and a secondary coil 40 connected mutually in parallel with the thermistor $R_2$. The input signals $\bar{\phi}_1$, $\bar{\phi}_2$ are applied to the inputs $A_1$ and $A_2$ from lines 19 and 20 respectively. By the use of earthed shielding and signal balancing techniques, the circuit can be arranged so that substantially only the modulated input signal $\bar{\phi}_2$ is received in the primary coil 39, and substantially all electrical interference induced in the remotely extending leads to the thermistor $R_2$, is damped.

Figure 9:
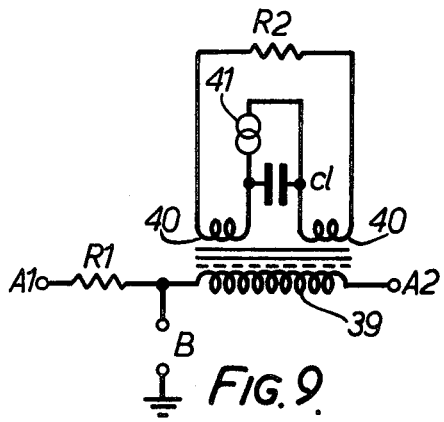
FIG. 9 is a schematic circuit diagram of a device for sensing a gas flow rate.

The arrangement shown in FIG. 8 can be modified for use in measuring gas flow rate past the thermistor $R_2$, and such a modified arrangement is shown in FIG. 9. A direct current is passed through the thermistor $R_2$ to heat the thermistor and the cooling effect of a gas flow past the thermistor is utilized to measure the gas flow rate.

The thermistor is fed with a direct current from a d.c. source 41 which is shunted by a capacitor $C_1$. The direct current causes a heating of the thermistor $R_2$ thereby effecting the value of its resistance. Gas flowing past the thermistor removes heat from the thermistor, and thus by comparing the phase $\phi$ of the output signal at B, and the value of the heating current, it is possible to monitor the gas flow rate past the thermistor. Such an arrangement has particular application for use in measuring the flow rate of air into an internal combustion engine.

Clearly, the sensing devices described with reference to FIGS. 6 to 10 are satisfactory for monitoring numerous different operating parameters of an internal combustion engine. However, not all operating parameters can be conveniently monitored with variable impedance elements, and for example, to monitor exhaust gases from an internal combustion engine, it is convenient to use a zirconium dioxide dielectric sensor which in use provides an output voltage in dependence on a difference in the partial pressures of oxygen on opposite sides of the dielectric. Such a sensor can be used to provide an output voltage indicative of the oxygen content of exhaust gases as is described in British Patent Specification No. 1,441,660.

A circuit arrangement for processing a voltage from such a sensor into the multiplexer 21 of FIG. 1, will now be described.

Figure 11:
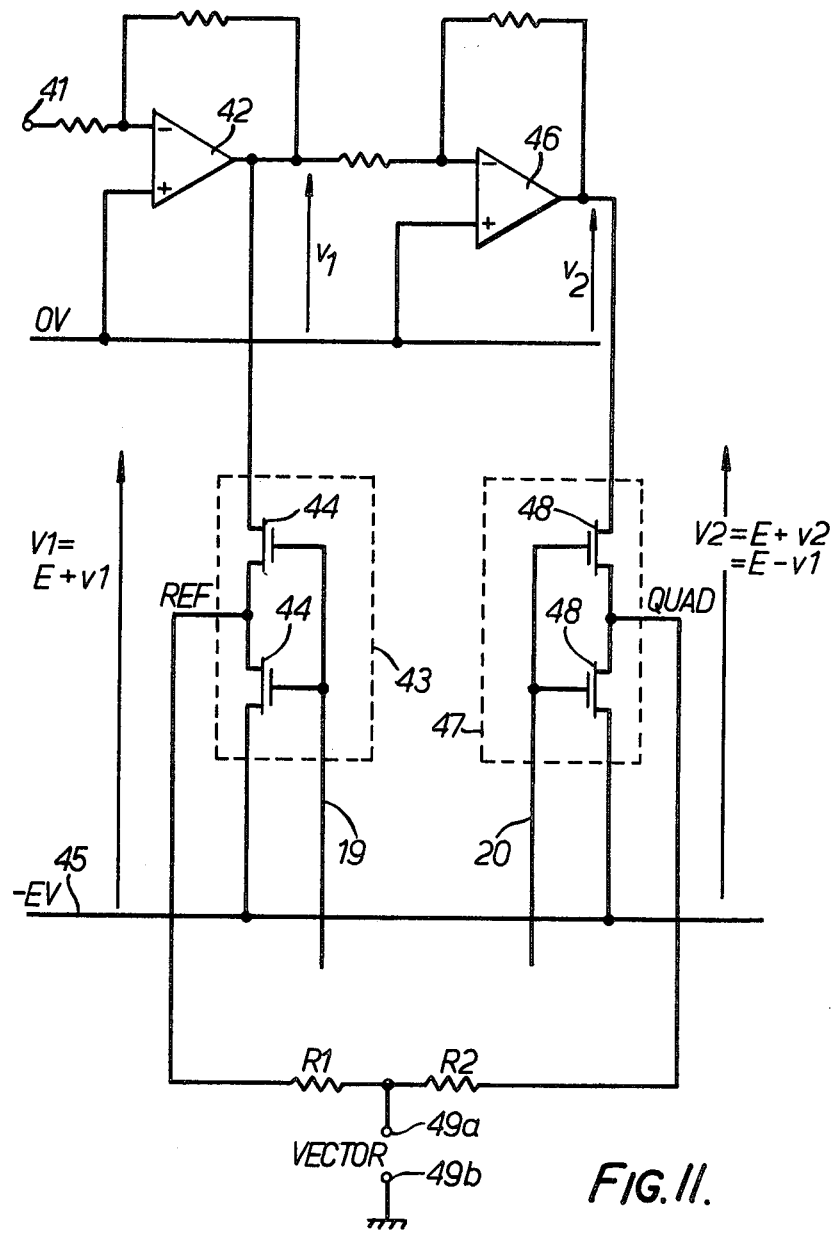
FIG. 11 is a schematic diagram of a circuit arrangement for providing an output signal having a phase indicative of the magnitude of a voltage derived for example from a zirconium dioxide oxygen sensor.

Referring now to FIG. 11, the circuit arrangement has an input 41 to receive a voltage produced upon use of a transducer such as the zirconium dioxide dielectric sensor aforementioned. The voltage is applied to an operational amplifier 42 and the output of the amplifier is fed to an amplitude modulator 43 comprising two MOS transistor devices 44 connected between a bus bar 45 at $-E$ volts and the output of the aforementioned operational amplifier 42. The gates of the transistors 44 are fed with the dual amplitude modulated signal from line 19 of FIG. 1.

The output of the amplifier 42 is also applied to an inverting amplifier 46, the output of which is applied to an amplitude modulator 47. Modulator 47 is similar to modulator 43 and comprises two MOS transistors 48 connected between bus bar 45 at −E volts and the output of the aforementioned inverting amplifier 46, the gates of the transistors 48 being connected to receive a signal from the dual amplitude modulator 6 of FIG. 1 on line 20.

The outputs from the modulators 43 and 47 are applied to respective equal value resistors R1, R2 which are series connected, and an output signal $\bar{S}$ is taken from a terminal 49A between the resistors and an earthed terminal 49B.

In operation of the circuit arrangement, the operational amplifier provides an output voltage $v_1$ which is directly proportional to the voltage applied to the terminal 41, whilst the inverting amplifier 46 produces an output voltage $v_2$ which is equal to and of opposite sign to the voltage $v_1$.

Thus $v_1 = -v_2$

Considering now the operation of the amplitude modulator 43, the input voltage V1 to the modulator is given by $V1 = (E + v_1)$ The voltage V1 amplitude modulates the signal from the line 19, which is the form sin wt: thus the output from the modulator is of the form $V1 \sin wt = (E + v_1) \sin wt$ Similarly the output V2 of the modulator 47 is of the form $(E + v_2) \cos wt = (E - v_1) \cos wt$ Thus the output developed at the terminals 49 is a vector sum of the outputs of the modulators 43 and 47, and as will be explained more fully below, the output has a phase which is a function of the value of the voltage $v_1$.

Now in this particular circuit, the amplifier 42 is arranged so that the maximum voltage excursion of $v_1$ is from −E to +E volts; thus the voltage excursion of $v_2$ is from +E to −E volts.

FIG. 12 illustrates the vector sum of the modulator outputs developed at terminals 49 when $v$ is at a maximum value. From the foregoing, it will be appreciated that when $v_1 = E$ volts, $V1 = 2E$ volts and $V2 = 0$ hence, the output at terminal 49 will be of the form 2E sin wt.

FIG. 13 illustrates the vector sum developed at terminals 49 when $v_1$ is at its minimum value of −E volts. In this condition:

$V1 = 0$ and $V2 = 2E$ volts

Hence, the output at 19 is of the form 2E cos wt.

Thus, it will be apparent that the phase of the output signal at 19 will shift through 90° in dependence upon the value of $v_1$, thereby to provide an output signal with a phase directly dependent upon the magnitude of the voltage applied to the terminal 10 from the transducer.

Figure 2:
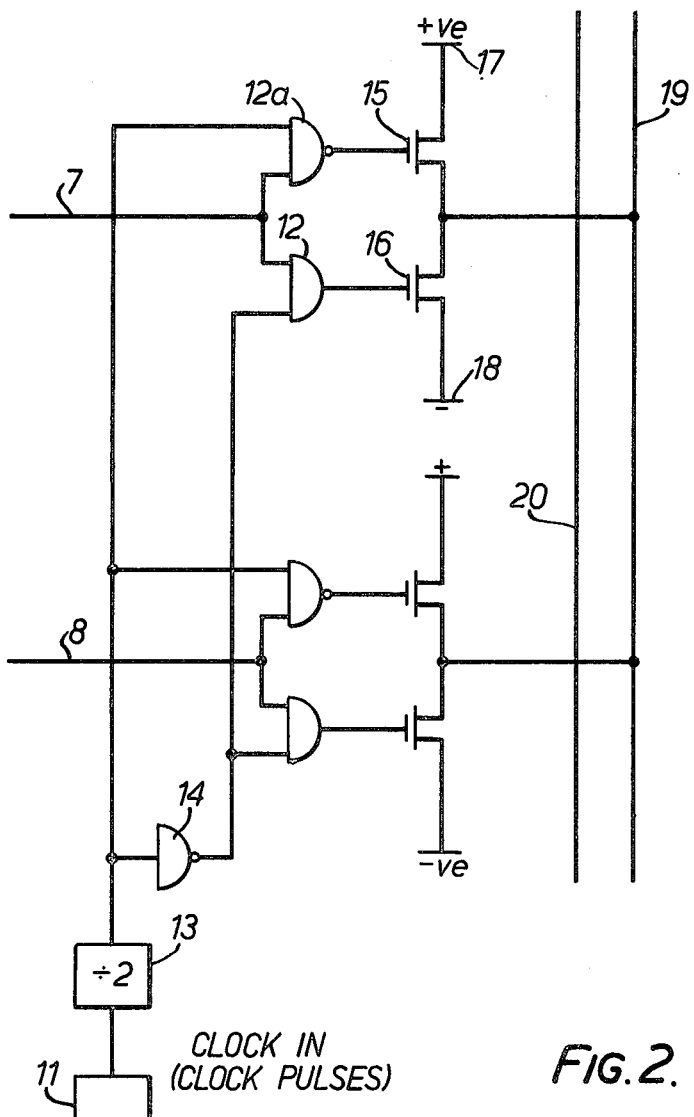
FIG. 2 is a more detailed schematic block diagram of a dual amplitude modulator shown in FIG. 1.

FIG. 14 illustrates the condition in which the phase of the output signal is mid-way between the extreme positions shown in FIGS. 2 and 3. This condition is achieved when $v_1 = v_2 = 0$, the outputs of the modulators 43 and 47 then being E sin wt and E cos wt respectively.

The output developed at the terminals 49 is applied to the vector signal multiplexer 21 of FIG. 1 so as to accumulate in the store 4 a count indicative of the voltage applied to the input terminal 41 of FIG. 10.

Thus, when a zirconium dioxide sensor responsive to the oxygen content of the exhaust of an internal combustion engine is connected to the input 41, the store 4 is charged with a number indicative of the oxygen content of the exhaust, thereby indicating the efficiency of burning of fuel in the engine.

Another embodiment of the circuit arrangement is shown in FIG. 15. In this arrangement, the reference and quadrature signals from lines 19 and 20 are applied to the gates of transistors 50 and 51 that are connected in series with resistors R3 and R4 between bus bars 52 and 53, bus bar 52 being at 0 volts and bus bar 53 being at −E volts. A differential operational amplifier 54 has its output connected to a terminal 55 between the resistors R3 and R4. The non-inverting input to the amplifier has a voltage applied thereto of −E/2 volts, and an input voltage from a sensor (not shown) is applied to the amplifier inverting input.

Output resistors R1 and R2, which correspond to the same referenced resistors of FIG. 11, are connected to the resistors R3 and R4 through capacitors C1 and C2 which have a value arranged to pass the frequency w of the signals from the lines 19 and 20. A vector output signal is developed across the resistors R1 and R2 in a similar way as described with reference to FIG. 11.

The circuit operation is as follows. The quadrature signal applied to transistor 50 from the line 20 is modulated by the voltage developed between OV and terminal 55. Similarly, the reference signal applied to transistor 51 from the line 19 is modulated by the voltage developed between terminal 55 and −EV. The magnitude of these voltages are dependent on the magnitude of the voltage from the transducer. These voltages cause alternating voltages to be developed in the resistors R1 and R2 and hence produced an output signal 49, the phase of which is dependent on the magnitude of the voltage from the transducer.

By way of example, consider the following two extreme cases.

When the voltage applied to the inverting input of the amplifier 54 is such that the voltage at the amplifier output terminal 55 is −E volts, the voltage developed across R3 is E volts and across R4 is 0 volts. Thus the output signal at 49 is in phase quadrature with the reference drive signal.

When the voltage applied to the inverting input of the amplifier 54 is such that the voltage at the amplifier output terminal 55 is 0 volts, the voltage developed across R3 is 0 volts and across R4 is E volts. Thus the output signal 19 is in phase with the reference drive signal.

Thus the phase of the output signal 19 can be varied between 0 and 90° in dependence on the transducer output voltage. Thus, the circuit arrangement of FIG. 1 can be modified to include different sensing devices so that information can be established in the store 4 relating to for example the operating parameters of an internal combustion engine. The information in the store 4 can be fed to a computing device, which is not shown, to develop control signals for controlling the spark ignition of the engine. The transducer of the invention does however have many other uses, and could for example be used to load into the store 4 operating parameters of remote components of an air conditioning system, such that operation of the system can be controlled from a central position.

Whilst in the circuit arrangement described with reference to the drawings, the sensing devices are fed with signals $\bar{\phi}_1$, $\bar{\phi}_2$ which are pulse signal trains modulated in a sinusoidal and cosinusoidal manner, it will be appreciated that other input signals of the same frequency and which are switched in and out of phase repetitively, can be used. However, the pulse width modulated signals of FIG. 1 have the advantage that the output signal $\bar{S}$ from the sensing devices can be applied directly to the processing circuit 3 as a digital number without the need for analogue to digital conversion of the signal.

We claim:

1. A transducer for producing electrical signals which are a function of a plurality of different parameters, comprising
   (a) signal generating means for generating first and second signals having the same frequency characteristic;
   (b) control means arranged to provide first and second phase relationships between said first and second signals during first and second periods respectively;
   (c) a plurality of parameter sensing devices each for combining said first and second signals in relative proportions dependent upon the value of one of said parameters so as to derive a sum signal of said first and second signals;
   (d) sum signal selecting means arranged to select sequentially sum signals from said plurality of parameter sensing devices, and
   (e) means responsive to the sum signal from said selecting means and arranged to produce a phase measurement signal which is indicative of the difference in phase of the selected sum signal developed during said first and second periods, whereby to derive sequentially a plurality of output signals each indicative of one of said parameters.

2. A transducer in accordance with claim 1 wherein at least one of said parameter sensing devices is responsive to a displacement and comprises
   (a) first and second coils to receive the first and second signals from said control means;
   (b) third and fourth coils connected together to form said sum signal;
   (c) a fixed screen having apertures therein to define magnetic flux paths between said first and third coils, and said second and fourth coils respectively, and
   (d) a movable screen for being displaced in accordance with said parameter, the screen having apertures therein arranged such that the movable screen obturates said flux paths selectively in dependence upon the relative positions of the screens.

3. A transducer in accordance with claim 1 wherein at least one of said parameter sensing devices comprises:
   (a) a sum signal output,
   (b) first and second impedance elements connected to said sum signal output, said elements being connected to receive respectively said first and second signals from the control means, and
   (c) means for varying the impedance presented by at least one of said elements in accordance with the value of one of said parameters, whereby to control the relative proportions of said signals combined at said sum signal output.

4. A transducer in accordance with claim 3 wherein said sensing device is responsive to a displacement and comprises a potentiometer comprising a resistive track arranged to receive said first and second signals at opposite ends of the track, and a slider connected to said sum signal output, said slider being mounted for movement along the track in response to said displacement.

5. A transducer in accordance with claim 3 wherein said sensing device is responsive to temperature and wherein said first element presents an electrical impedance which varies with temperature.

6. A transducer in accordance with claim 5 wherein said first element comprises a thermistor.

7. A transducer in accordance with claim 6 wherein said first element is arranged remotely of said second element, and including a transformer having primary and secondary coils, said primary coil being connected to said sum signal output and said secondary coil being connected to said first element.

8. A transducer in accordance with claim 3 wherein said sensing device is responsive to a fluid flow rate, said first impedance element presenting an impedance which is a function of its temperature, the device including means for passing an electric heating current through said first element, whereby said phase measurement signal is indicative of fluid flow rate past said first element.

9. A transducer in accordance with claim 8 and including a transformer having primary and secondary coils, said primary coil being connected to said sum signal output and said secondary coil being connected to said first element, and a d.c. current source connected to said first element to supply said heating current.

10. A transducer in accordance with claim 1 wherein at least one of said parameter sensing devices is responsive to the magnitude of a voltage and comprises, modulating means for modulating the amplitude of said first signal from the control means in accordance with the magnitude of said voltage, and combining means for combining the modulated first signal and said second signal whereby to produce said sum signal.

11. A transducer in accordance with claim 10 wherein said modulating means is arranged to modulate the amplitude of said second signal in accordance with the magnitude of said voltage, the modulation effected to said first and second signals by the modulating means being in opposite senses.

12. A transducer in accordance with claim 11 wherein said combining means comprises a sum signal output, first and second fixed value impedance elements connected to said output and arranged to receive said modulated first and second signals respectively.

13. A transducer in accordance with claim 12 including an operational amplifier having an input to receive said voltage, and a transistor arranged to modulate the output of said amplifier with said first signal from the control means.

14. A transducer in accordance with claim 13 including an inverting amplifier connected to said operational amplifier, and a transistor arranged to modulate an output from said inverting amplifier in accordance with second signal from the control means.

15. A transducer in accordance with claim 12 including third and fourth impedance elements connected together at a summing junction and in parallel with said first and second elements, means for applying said first and second signals to said third and fourth elements respectively, and an operational amplifier arranged to apply to said junction a signal indicative of said voltage, whereby to control the relative proportions of said first and second signals applied to said first and second impedance elements.

16. A transducer in accordance with claim 1 wherein said signal generating means is arranged to produce said first and second signals with a waveform comprising a regular pulse sequence, the widths of the pulses of which are modulated in a sinusoidal manner, the control means being arranged to produce a phase quadrature relationship between modulations of said first and second signals during said first period, the control means producing an in phase relationship of said modulations during said second period.

17. A transducer in accordance with claim 16 and including a generator for generating clock pulses at a predetermined frequency, a modulator responsive to said generator and arranged to amplitude modulate said first and second signals at the frequency of said clock pulses, and a demodulator responsive to said clock pulse generator and arranged to demodulate said sum signal.

18. A transducer in accordance with claim 16, and including a clock pulse generator, and counting means responsive to the sum signal selected by said selecting means, said counting means being arranged to count upwardly clock pulses from said pulse generator during pulses in said selected sum signal developed during said first period, and said counting means being arranged to count downwardly clock pulses from said generator during pulses in said sum signal developed during said second period, whereby said phase measurement signal comprises the count remaining in the counting means after said upward and said downward count.

19. A transducer in accordance with claim 1 and including a store arranged to receive the plurality of phase measurement signals indicative of said plurality of parameters.

20. A circuit for producing output signals which are indicative of a plurality of different parameters as sensed by a plurality of parameter sensing devices, said circuit comprising:
(a) signal generating means for producing two signals each comprising a regular pulse sequence the pulse width of which is modulated in a sinusoidal manner,
(b) control means arranged to provide a quadrature phase relationship between the modulations of said signals during a plurality of successive equal first periods, said control means being such that the said modulations are in phase during a plurality of second periods each equal to and subsequent to a respective one of said first periods,
(c) output means for applying the signals developed by said control means to a plurality of parameter sensing devices that each combine said signals in relative proportions dependent upon the value of a respective one of the parameters so as to derive a sum signal having a phase indicative of the value of the parameter during said first periods,
(d) sum signal selecting means arranged to select sequentially one of the sum signals developed by said plurality of parameter sensing devices,
(e) a clock pulse generator, and
(f) counting means responsive to said control means and to the sum signal selected by said selecting means, the counting means being arranged to count upwardly clock pulses from said generator during pulses in said selected sum signal developed during one of said first periods and being arranged to count downwardly clock pulses during pulses in said selected sum signal developed during one of said second periods whereby to develop sequentially a plurality of residual counts in said counter, each residual count being indicative of the value of one of said parameters.

21. In a transducer for producing an electrical signal which is a function of the value of a parameter and that includes
signal generating means for generating first and second signals having the same frequency characteristic, control means arranged to provide first and second phase relationships between said first and second signals during first and second periods respectively, a parameter sensing device for combining said first and second signals in relative proportions dependent upon the value of said parameter so as to derive a sum signal of said first and second signals, and means responsive to the sum signal and arranged to produce a phase measurement signal which is indicative of the difference in phase of the sum signal developed during said first and second periods, whereby to derive an output signal indicative of said parameter, the improvement comprising that the parameter sensing device comprises
(a) first and second coils to receive the first and second signals from said control means;
(b) third and fourth coils connected together to form said sum signal;
(c) a fixed screen having apertures therein to define magnetic flux paths between said first and third coils, and said second and fourth coils respectively, and,
(d) a movable screen for being displaced in accordance with said parameter, the screen having apertures therein arranged such that the movable screen obturates said flux paths selectively in dependence upon the relative positions of the screens.

22. In a transducer for producing an electrical signal which is a function of the value of a parameter and that includes
signal generating means for generating first and second signals having the same frequency characteristic, control means arranged to provide first and second phase relationships between said first and second signals during first and second periods respectively, a parameter sensing device for combining said first and second signals in relative proportions dependent upon the value of said parameter so as to derive a sum signal of said first and second signals, and means responsive to the sum signal and arranged to produce a phase measurement signal which is indicative of the difference in phase of the sum signal developed during said first and second periods, whereby to derive an output signal indicative of said parameter, the improvement comprising that the parameter sensing device comprises:
(a) a sum signal output,
(b) first and second impedance elements connected to said sum signal output, said elements being connected to receive respectively said first and second signals from the control means, and
(c) means for varying the impedance presented by at least one of said elements in accordance with the value of one of said parameters, whereby to control the relative proportions of said signals combined at said sum signal output.

23. A transducer in accordance with claim 22 wherein said sensing device is responsive to a displacement and comprises a potentiometer comprising a resistive track arranged to receive said first and second signals at opposite ends of the track, and a slider connected to said sum signal output, said slider being mounted for movement along the track in response to said displacement.

24. A transducer in accordance with claim 22 wherein said sensing device is responsive to temperature and wherein said first element presents an electrical impedance which varies with temperature.

25. A transducer in accordance with claim 24 wherein said first element is arranged remotely of said second element, and including a transformer having primary and secondary coils, said primary coil being connected to said sum signal output and said secondary coil being connected to said first element.

26. A transducer in accordance with claim 22 wherein said sensing device is responsive to a fluid flow rate, said first impedance element presenting an impedance which is a function of its temperature, the device including means for passing an electric heating current through said first element, whereby said phase measurement signal is indicative of fluid flow rate past said first element.

27. In a transducer for producing an electrical signal which is a function of the value of a parameter and that includes
signal generating means for generating first and second signals having the same frequency characteristic, control means arranged to provide first and second phase relationships between said first and second signals during first and second periods respectively, a parameter sensing device for combining said first and second signals in relative proportions dependent upon the value of said parameter so as to derive a sum signal of said first and second signals, and means responsive to the sum signal and arranged to produce a phase measurement signal which is indicative of the difference in phase of the sum signal developed during said first and second periods, whereby to derive an output signal indicative of said parameter, the improvement comprising that the parameter sensing device is responsive to the magnitude of a voltage and comprises, modulating means for modulating the amplitude of said first signal from the control means in accordance with the magnitude of said voltage, and combining means for combining the modulated first signal and said second signal whereby to produce said sum signal.

28. A transducer in accordance with claim 27 wherein said modulating means is arranged to modulate the amplitude of said second signal in accordance with the magnitude of said voltage, the modulation effected to said first and second signals by the modulating means being in opposite senses.

29. A transducer in accordance with claim 28 wherein said combining means comprises a sum signal output, first and second fixed value impedance elements connected to said output and arranged to receive said modulated first and second signals respectively.

* * * * *